April 12, 1938. C. L. NEWPORT ET AL 2,113,766

PIPE INSULATION

Filed May 18, 1936

Charles L. Newport
Hubert C. Smith
INVENTORS.

Patented Apr. 12, 1938

2,113,766

UNITED STATES PATENT OFFICE 2,113,766

PIPE INSULATION

Charles L. Newport and Herbert C. Smith,
Los Angeles, Calif.

Application May 18, 1936, Serial No. 80,287

3 Claims. (Cl. 154—44)

Our invention relates to pipe-covering and has for its object to provide a highly efficient and durable covering embodying a metal jacket lined with insulating material which material of itself possesses no appreciable resistance to compression or distortion, but which is so articulated with the metal covering as to provide the highly desirable combination of durability and efficiency.

Another and important object of the invention is to employ the rigidity of metal to provide for spacing the metal jacket with respect to the pipe while reducing to a practical minimum the conduction of heat from the pipe to the outer surface of the jacket; the purpose of properly spacing the jacket being to insure even distribution of insulating material while preventing its being compressed; the invention being more particularly directed to the use of rock-wool and like products which have high insulating value when the density is constant.

Pipe covering is usually quite bulky; expensive to pack and ship and readily damaged when supplied in forms or shapes which insure a neat and durable application, and accordingly it is an object of our invention to provide pre-fabricated matched pipe-covering sections which may be shipped in substantially flat form; thereby reducing the cost of handling and shipping.

Another important object of the invention is to reduce the cost of manufacture of pipe covering, particularly high-temperature covering. Heretofore it has been necessary to fabricate the sections in arcuate or semicircular forms and the cost of moulding, shaping or otherwise forming pipe-covering sections has been an appreciable item. The present invention provides for fabricating pipe-covering in what may be termed sheet-form, with each sheet so fabricated that upon being rolled about a pipe will properly dispose itself concentrically thereof and when suitably secured at its abutting edges will provide a most efficient and decidedly rigid covering notwithstanding the fact that the most efficient insulating material is usually the least durable.

In the preferred embodiment of our invention we provide a sheet of metal adapted to be formed about a pipe and which is initially rolled so that it will readily take a circular form; the metal being returned to nearly flat form again before manufacture proceeds. Then the metal sheet is lined with a pad of felt, rock-wool, or any other efficient and flexible material of high insulating value.

It is another and important object of the invention to provide means for retaining such pad to the metal as to carry out the objects of this invention while permitting practically direct contact of the pad with the pipe while the said means acts to dependably and permanently space the metal with respect to the pipe without promoting more than negligible flow of heat from the pipe to the jacket (or vice-versa where the pipe-covering is used in refrigeration work).

Other objects include ease of assembly and installation. In connection therewith it is an object of the invention to provide simple and efficient means for locking the pad in place in assembling, and to provide simple and effective means for quickly locking the covering with respect to the pipe being covered.

We have illustrated our invention by the accompanying drawing in which.

Figure 2:
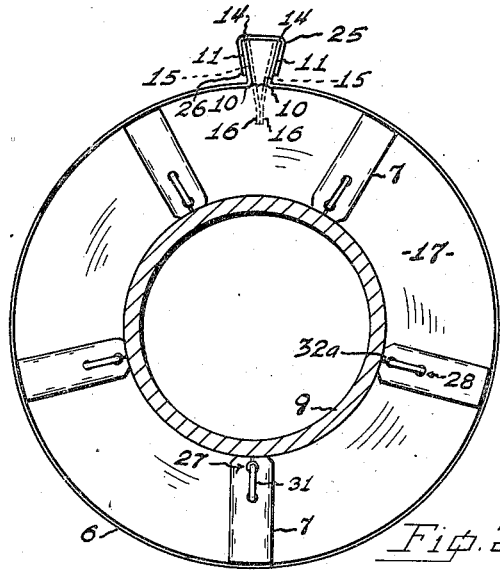
Figure 2 is a cross sectional view of the covering section as it appears when applied to a pipe.

The numeral 6 indicates the aforesaid sheet of metal which has been first rolled and then returned to substantially flat form; the metal being thereby readily formed about the pipe as shown in Figure 2. To the inner face of the metal sheet 5A, a plurality of spacers 7, 7 are affixed as at 8, 8, so that when the sheet is shaped around a pipe 9 as shown in Figure 2, said spacers act to contact the pipe at their extreme ends only and to dispose the metal sheet concentrically about the pipe.

The metal covering 6 provides abutting edges 10, 10, which quite closely meet when the metal sheet 5 is formed and spaced around the pipe. At 10, 10, the metal is bent as at 11, 11, to continue tangentially and not truly radially outward from the circular covering; this bending being done in manufacture so that when the metal sheet is practically flat the projection or flange 11 is at less than right angle to the plane of the metal sheet.

Thus when the metal sheet is formed about the pipe as shown in Figure 2 the edges 10, 10 practically abut each other while the flanges 11, 11, diverge outwardly and are co-extensive of the pipe covering section axially thereof.

At each flange enough metal remains to provide, in manufacture, for the metal at each flange being bent as at 14, 14 back upon itself to continue as at 15, 15 in close contiguity to the corresponding flange 11 to provide a flange of double thickness and to continue as at 16, 16, inwardly a suitable distance but not sufficiently to abut the pipe when the covering is in place as in Figure 2.

Figure 1:
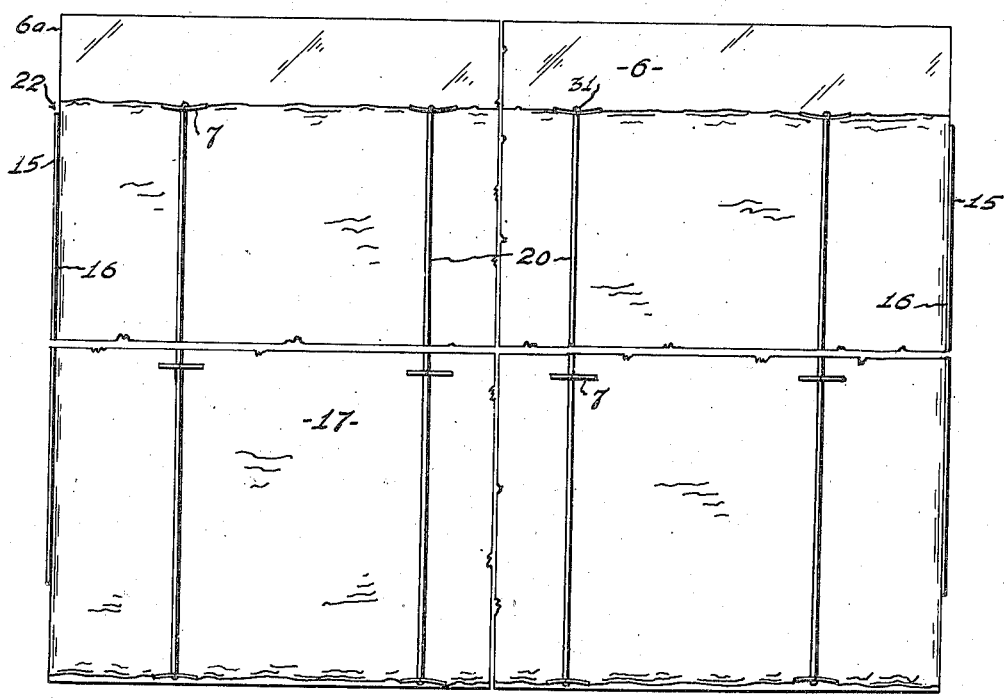
Figure 1 is a plan view of a pipe covering section built in conformity with this invention.

In the form shown in Figure 1 portions 11, 11, 15, 15, and 16, 16 respectively lie in planes which are acute with respect to the flat sheet so that when the sheet is formed as in Figure 2 said planes are not truly radial but are tangential to the round pipe-covering section.

In completing the manufacture of the pipe covering section the pad 17 of felt rock-wool, or the like is placed over substantially the entire area of the inner surface of the sheet 6 and in a thickness to just cover the spacers 7, 7; which spacers are normal to the plane of the sheet when it is in flat form and project radially inwardly to contact the pipe when the sheet is formed around the pipe.

The spacers 7, 7 are arranged in rows extending axially of the pipe-covering; the number of such rows preferably increasing with increase in circumference of the covering and the spacing of the spacers of each row depending on the thickness or gauge of the metal employed, and to some extent upon the nature of the pad.

In manufacture the pad is cut and fitted to fit fully between the flange portions 16 and 16 considered transversely and between the outer-most spacers of the sheet considered longitudinally or axially.

Figure 3:
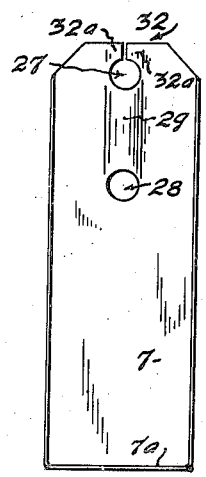
Figure 3 is a view in side elevation of a length of pipe which is being covered with such sections; the view showing several sections in place.

For each row of spacers there is provided a light-weight rod 20 long enough to extend from the spacer at one end of a row to the spacer at the other end of a row and said rods, by any suitable means, and more particularly by means hereinafter described in detail, are each secured to each and every spacer of a row so as to overlie the pad and permanently retain same in position. It will be understood that to permit of slight telescoping of the ends of abutting pipe sections where several are applied as shown in Figure 3, the metal sheet 6 at one end continues as at 6a beyond the corresponding end of the pad and the corresponding end spacers, while at the other end of the sheet or pipe-covering section the portions 15, 15 and 16, 16 of the flanges are cut away as at 22.

When the covering is formed around a pipe and the opposed flanges are brought into proximity to each other the spacers 7, 7, contact the pipe 9 and space the metal sheet concentrically around the pipe and prevent compression of the pad. These spacers, in abutting the pipe at their extreme ends have the very minimum of contact for heat conduction and the conduction through them is therefore reduced to a negligible quantity. As the pipe covering is thus moved or bent toward final disposition the portions 16, 16, of the flanges first abut by reason of their tangential positions and a tight metal to metal contact is assured at this point. To lock the flanges together we provide a channel 25, the length of the flanges, and this channel has its free ends 26, 26 bent inwardly to converge at substantially the angle at which the flanges 11, 11, diverge. This channel is then moved lengthwise over the diverging flanges until a channel completely encloses the flanges as shown in Figure 3, whereupon the action of the angularly abutting portions 16, 16 of the flanges, in tending to force away from each other is to hold the flanges frictionally in contact with corresponding portions of the channel to a degree which prevents the channel from moving axially of the section through vibration or like forces.

Figure 4:
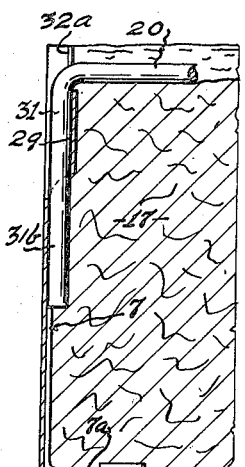
Figures 4 and 5 are views of a spacer used in this invention.
Figure 5:
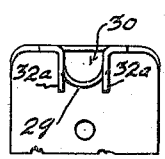

The spacers 7, 7 etc. are a salient feature of the embodiment illustrated and are more particularly illustrated in Figures 4 and 5 respectively. Each spacer is a narrow strip of metal terminating in an end 26 for receipt of the corresponding rod, and terminating at the other end in a foot 7a right angular thereto and adapted to contact the sheet 6 to which each and every spacer is secured as by a single rivet as at 8, 8. This single rivet is quickly and economically applied in manufacture and dispenses with unsightly soldered connections. Although only one rivet is employed to secure each spacer, the spacer is held from turning upon the rivet by the corresponding rod which connects each and every spacer of a row.

Near the extreme end 26 each spacer is provided with a small rod-receiving circular aperture 27, while spaced below each aperture 27 is another and similar aperture 28. The metal as at 29 between these two apertures is depressed from the usual plane so as to form a channel indicated at 30 thru which may be passed the bent end 31 of a rod 20 while portions of the rod-end as at 31a and 31b respectively, and not within the channel 30, are contiguous with the adjacent surface of the spacer metal.

That metal indicated at 32 and disposed between upper aperture 27 and the end 26 is divided axially of the spacer and the divided portions 32a, 32a form prongs which are bent at right angles to the adjacent metal.

Now it will be apparent that when the spacers are affixed to the sheet 6 in rows in the early stage of manufacture, they readily penetrate, and do not interfere with the application of, the pad 17 when same is laid down contiguously over sheet 6.

Next one of the rods—20 with its ends bent as at 31 is laid down over the pad 17 along a row of spacers and even should the thickness of the pad obscure the ends of the spacers, a slight pressure on the rod depresses it so that it then rests in the successive recesses provided by the apertures 27 and the divided portions of the metal 32a, 32a. Thus a rod is readily put into position without necessity for feeding the rod axially of the row of spacers and thru successive apertures.

The length of the rod and the spacing of the spacers at each end of a row is such that the bent ends of the rods fall, one into each corresponding channel 30, at the same time that intermediate portions of the same rod come to rest on the margins of apertures 27.

The final operation in manufacture consists in pressing the divided portions 32a, 32a, of each spacer-end back into normal position whereupon the rods are held against removal from apertures 27, while each rod end prevents axial movement of a rod by reason of being disposed each in the corresponding channel 30.

It will be apparent now that the flexible pad and the means described for holding same in position provide for the entire product being bent from substantially flat form to full circular form, particularly where the metal has been given an initial bending action. In packing and shipping the sections in substantially flat form the spacers and rods provide for superimposing one flattened section upon another successively in several layers without danger of subjecting the felt pad to compression, just as these rods and spacers act to support the metal jacket 6 in proper concentricity around the pipe.

Some pads, particularly certain rock-wool pads are so loosely articulated for the sake of high insulating value as to require being bound in or covered by some foraminous material ranging from screening to coarse wire mesh but in any event any pad or any insulating material which will conform to change from flat to round shape may be employed in carrying out this invention and is expediently secured and permanently held by the means described.

Other construction and arrangements of parts within the scope of the appended claims may be employed without departing from the spirit of this invention nor is the invention limited to the use of "metal", "felt", "rods" and the like since other material which might be substituted would be the equivalent.

We claim:

1. In a product of the class described the combination of a metal sheet, an insulating pad overlying said sheet, and a plurality of spacers secured to and projecting normally from said sheet thru said pad and arranged in rows, each spacer comprising; a thin narrow strip of metal provided adjacent its free end with a pair of spaced rod-receiving apertures; the metal between the free end of said spacer at the outermost aperture being divided and bent temporarily normally outward in a pair of spaced prongs and the metal of the spacer intermediate of the apertures being depressed to form a rod-receiving channel extending axially of the spacer; the product further including a plurality of rods one for each row of spacers; each rod being bent normally at each end, each rod reposing at points intermediate its ends in the first named apertures of the corresponding spacers; the bent ends of said rods each extended axially thru the channel of the corresponding spacer at the end of the corresponding row.

2. A rod-receiving spacer for pipe covering of the class described comprising, a strip of metal provided at one end with means for permanent attachment to a pipe-covering jacket and at the other end with a pair of spaced apertures; the metal between the last named end of said spacer and the adjacent aperture being divided and bent normally from the plane of the remaining metal; the metal between the said apertures being depressed to form a rod-receiving channel paralleling the axis of the spacer and beginning at one such aperture and terminating at the other of the said apertures.

3. In a product of the class described the combination of a metal sheet, an insulating pad overlying said sheet, a plurality of spacers secured to and projecting normally from said sheet thru said pad and arranged in rows, each spacer comprising; a strip of metal provided adjacent its free end with a rod receiving aperture; the metal between the free end of said spacer and the outermost aperture being divided and bent temporarily normally outward in a pair of spaced prongs; the product further including a plurality of rods one for each row of spacers; each rod reposing at points intermediate its ends in the apertures of the corresponding row of spacers.

CHARLES L. NEWPORT.
HERBERT C. SMITH.